(No Model.)
F. H. TREAT.
STOP OR GATE VALVE.
No. 269,138.  Patented Dec. 12, 1882.
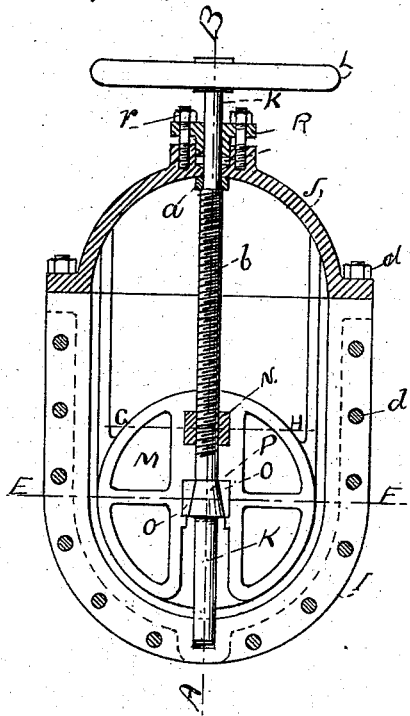
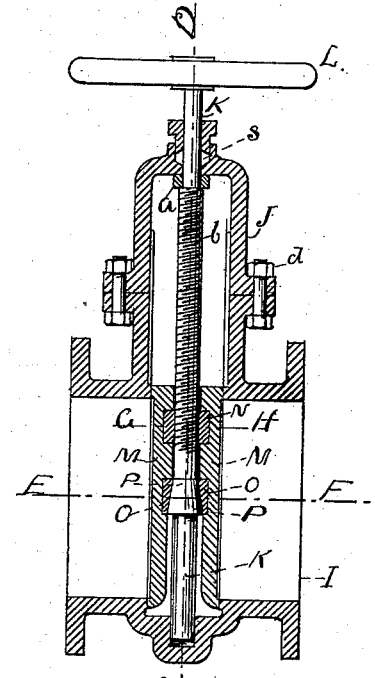
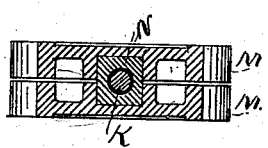
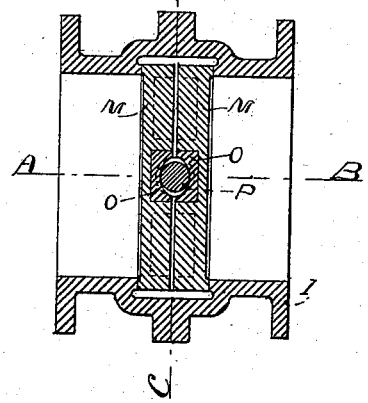
WITNESSES:
A. C. Fairchild
[signature]
INVENTOR:
Francis H. Treat

UNITED STATES PATENT OFFICE.

FRANCIS H. TREAT, OF JOLIET, ILLINOIS.

STOP OR GATE VALVE.

SPECIFICATION forming part of Letters Patent No. 269,138, dated December 12, 1882.

Application filed December 27, 1881. (No model.)

*To all whom it may concern:*

Be it known that I, FRANCIS H. TREAT, a citizen of the United States, residing at Joliet, in the county of Will and State of Illinois, have invented a new and useful Stop or Gate Valve, of which the following is a specification.

My invention relates to that class of stop or gate valves in which the gate consists of two paralleled disks or plates with one bearing-surface, each facing outwardly and opposite, sliding in unison, but capable of being separated independently and of being forced apart to a bearing upon opposite and paralleled seats when the valve is closed; and the objects of my improvements are to provide a means of actuating the disk by which they will be loose and perfectly free to move across the pipe-opening and press firmly and uniformly upon their seats when the valve is shut. I attain these objects by the mechanism illustrated by the drawings, in which—

Figures 1, 2, and 4 are sectional views of the valve, taken respectively on the lines C D, A B, and E F. Figs. 3 is a section of the gate on line G H.

Similar letters refer to similar parts throughout the several views.

I is the valve-case; J, the bonnet or cap; M M, the disks or plates constituting the gate; K, valve-stem; R, stuffing-box; S, gland; r, gland-stud bolts; L, hand-wheel; d d, bolts holding on bonnet and the two parts of the casing together. The valve-stem has no movement endwise, and extends diametrically across the pipe-opening, having two bearings, one in the stuffing-box and the other in the side of the case opposite the bonnet. b is a screw cut thereon, which as the valve-stem is revolved causes the nut N to traverse it, which nut, being interlocked with disks M M by fitting in corresponding recesses therein, causes said disks to travel along with it, thus raising or lowering the disks, as may be desired, to open or close the valve. O O are contact-pieces or saddles with cylindrically-concave faces, that fit in corresponding recesses in the centers of the disks, which contact-pieces, when in the act of closing the valve the disks have arrived opposite their seats, are forced by the nut N against the inclined surface of the frustum of a cone, P, upon the valve-stem, opposite the center of the valve opening or passage in the case, which cone, in the progressive movement of the disks, acts as a wedge, entering between the said contact-pieces and through their medium to force the disks apart and against their seats, and promptly releases them in commencing to open the valve.

I am aware that prior to my invention stop or gate valves have been made in which the gate consists of two separate disks operated with a valve-stem screw and various systems of wedges, &c., to crowd them tightly against their seats when the valve is shut. I therefore do not claim such a combination, broadly; but What I do claim, and desire to secure by Letters Patent, is—

In stop or gate valves in which the gates consist of disks which move loosely across the pipe-opening, the valve or operating stem provided with cone P, in combination with the disks M, provided with contact or saddle pieces O, the whole operating to force said disks to a tight bearing upon their seats, substantially as set forth.

FRANCIS H. TREAT.

In presence of—
   GEO. J. MUNROE,
   S. O. SIMONDS.